US012170666B1

(12) United States Patent
Bhatt et al.

(10) Patent No.: US 12,170,666 B1
(45) Date of Patent: Dec. 17, 2024

(54) AUTHENTICATION PROVIDER DISCOVERY

(71) Applicant: Amazon Technologies, Inc., Seattle, WA (US)

(72) Inventors: Jaimin Bhatt, Seattle, WA (US); Ken Chu, Seattle, WA (US); Jack A. Drooger, Seattle, WA (US); Frank Johnston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/143,307

(22) Filed: Sep. 26, 2018

(51) Int. Cl.
H04L 9/40 (2022.01)
(52) U.S. Cl.
CPC ...... H04L 63/0884 (2013.01); H04L 63/0807 (2013.01); H04L 63/10 (2013.01)
(58) Field of Classification Search
None
See application file for complete search history.

(56) References Cited

U.S. PATENT DOCUMENTS

| | | | | |
|---|---|---|---|---|
| 8,813,186 B2* | 8/2014 | Hegg | ............... | H04L 63/0876 713/168 |
| 9,059,985 B1* | 6/2015 | Treleaven | ............... | H04L 63/08 |
| 2015/0215305 A1* | 7/2015 | Wetzel | ............... | H04W 12/06 726/9 |
| 2017/0111338 A1* | 4/2017 | Malatesha | ........... | H04L 63/0807 |
| 2017/0230351 A1* | 8/2017 | Hallenborg | ............ | H04L 63/08 |
| 2017/0237734 A1* | 8/2017 | Hallenborg | ......... | H04W 12/069 726/7 |
| 2019/0026455 A1* | 1/2019 | Yao | ...................... | G06F 21/335 |
| 2019/0289017 A1* | 9/2019 | Agarwal | .................. | H04L 9/12 |

OTHER PUBLICATIONS

Ceccanti, A., Vianello, E. and Michelotto, D., 2020. Token-based authorization in StoRM WebDAV. In EPJ Web of Conferences (vol. 245, p. 04020). EDP Sciences. (Year: 2020).*
Bonneau, J., Herley, C., Van Oorschot, P.C. and Stajano, F., May 2012. The quest to replace passwords: A framework for comparative evaluation of web authentication schemes. In 2012 IEEE symposium on security and privacy (pp. 553-567). IEEE. (Year: 2012).*

* cited by examiner

*Primary Examiner* — Roderick Tolentino
*Assistant Examiner* — Edward X Long
(74) *Attorney, Agent, or Firm* — Davis Wright Tremaine LLP

(57) ABSTRACT

A system receives an authentication request from a requestor system for a token to access one or more computing resources associated with a computing resource service provider. The system analyzes information included with the authentication request and, based on the information included with the authentication request, selects an authentication provider from a plurality of authentication providers without additional input from the requestor system. The requestor system is redirected to the selected authentication provider such that the token is provided in response to the authentication request. The requestor system then presents the token to obtain an identity assertion that can be used to access the one or more computing resources.

20 Claims, 10 Drawing Sheets

AUTHENTICATION PROVIDER DISCOVERY

BACKGROUND

As the amount of digital information continues to increase, the demand for the security to access the digital information is also increasing. The security protocol to access digital information can be complex as, in some instances, it may require the need of multiple tokens and passwords before a user device can obtain access to the digital information. User devices often utilize networks that often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data that these organizations hold can be challenging, especially as the size and complexity of such configurations grows.

BRIEF DESCRIPTION OF THE DRAWINGS

Various techniques will be described with reference to the drawings, in which.

DETAILED DESCRIPTION

Figure 1:
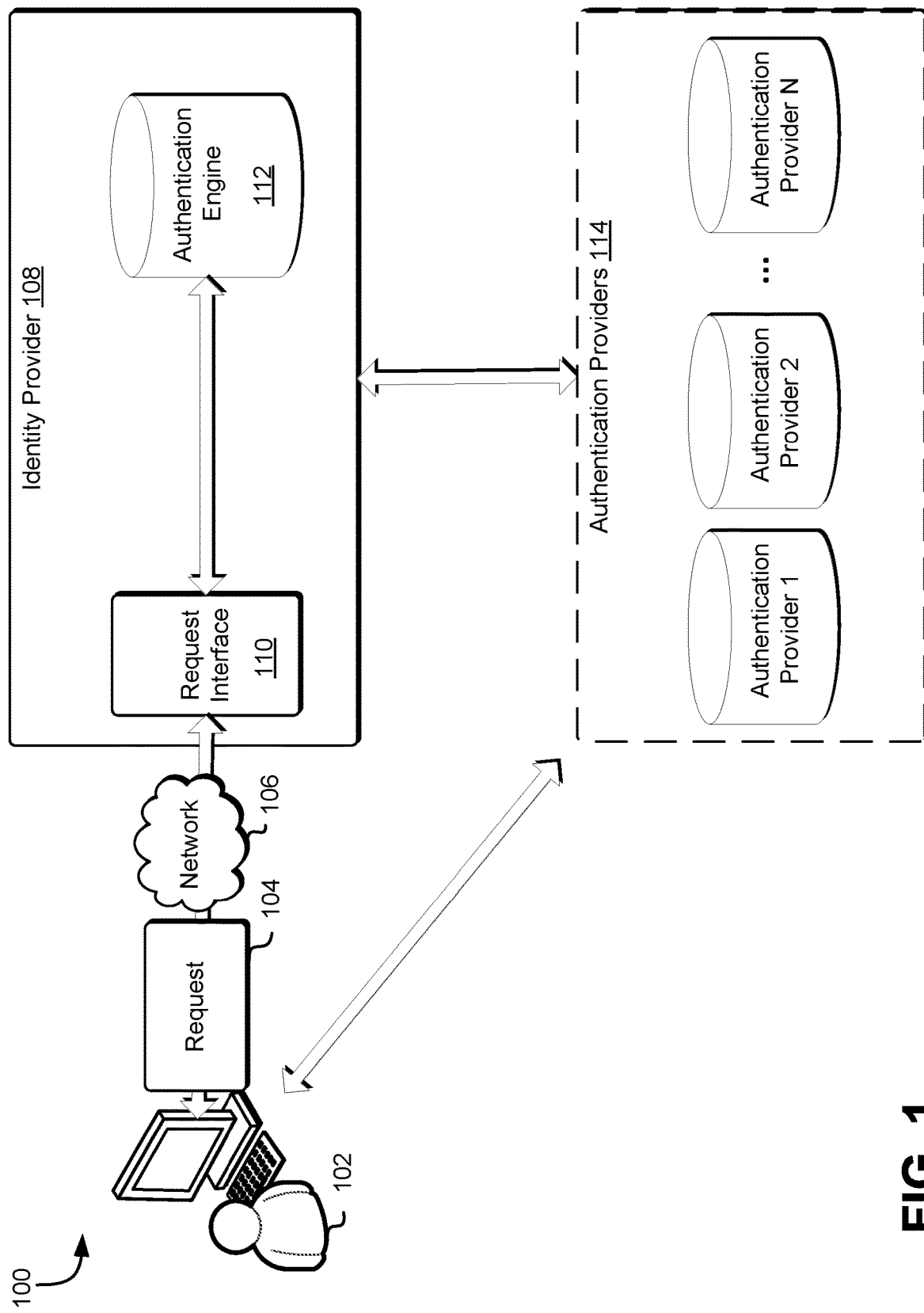
FIG. 1 shows an illustrative example environment between a computing device and an identity provider.

The present document describes a system and one or more methods for selecting an authentication provider in response to an authentication request for a token to access computing services, computing resources, and/or digital information. A system configured to provide one or more services may require users of the system to authenticate their identity before the system will perform certain operations and, generally, before the system will provide access to the one or more computing services, computing resources, and/or digital information. In an example implementation, the techniques described herein enable a dynamic selection of an authentication provider from a plurality of authentication providers using information included in the authentication request. Using information, such as the network location of the request, the system may select an authentication provider capable of fulfilling the request. In this manner, when computing services are associated with multiple authentication providers, a dynamic behavior that selects an authentication provider out of a plurality of authentication providers best suited to respond to a request for a token to access resources, based on information included in the request and without requiring additional input or information from the requestor system, can be provided.

In an example implementation, a request is generated by a computing device (e.g., requestor system). Information included with the request is analyzed as input to a discovery strategy, which may be implemented using discovery logic. The discovery strategy uses this information to select which authentication provider out of a plurality of authentication providers is to be used to generate a token to provide back to the requestor system. The discovery strategy may be predetermined based on customer configurations and/or system policies. The discovery strategy may be a set of instructions that takes information included in the request as input and outputs an authentication provider that is capable of satisfying the request. After the discovery strategy is implemented, an authentication provider may be selected (as a result of matching information between information from the request and information about the authentication provider) and the requestor system is routed, which may be performed by redirecting the requestor system to the selected authentication provider such that an authentication token can be provided. The token can then be presented by the requestor system to the identity provider to obtain an identity assertion such as a Security Assertion Markup Language (SAML) assertion. The identity assertion enables the requester system to access the at least one of computing services, computing resources, and/or digital information.

Techniques described and suggested herein also provide many technical advantages to the improvement and efficiency of an identity provider's ability to select an authentication provider given information obtained from an authentication request generated by a computing device seeking to access computing resources. Typically, a user's web services rely on a single authentication provider which limits the web service's ability to provide dynamic behavior based on various factors such as network location, device capability, availability of authentication tokens (e.g., Virtual Private Network (VPN) tokens, Yubikey, OAuth tokens, Security Assertion Markup Language (SAML), and Single Sign-On (SSO) tokens) for individual users. The techniques described herein would result in a seamless authentication experience as a module (e.g., authentication engine) is created to perform functions in connection with an identity provider such that the identity provider dynamically selects an authentication provider based on varying factors and information obtained from the authentication request. As a result of this, the identity provider that receives the authentication request can efficiently select an authentication provider and redirect the requestor system to the selected authentication provider that is best suited to provide an authentication token to satisfy the request.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 between a computing device 102 and an identity provider 108. The example environment 100 illustrates that a request 104 for a token to access one or more computing resources may be submitted by a computing device 102. In an example implementation, the request 104 may be generated by the computing device 102 using an application programming interface (API) that is configured to receive user input/instructions. In various embodiments, such as a user interface may include graphical user interfaces (GUIs), web-based interfaces, and/or sets of remote procedure calls (RPCs) corresponding to interface elements, messaging interfaces in which the interface elements correspond to messages of a communication protocol, and/or suitable combinations thereof. Such requests and responses may be submitted over any suitable communications protocol, such as Hypertext Transfer Protocol ("HTTP"), HTTP 2.0, File Transfer Protocol ("FTP"), and the like, in any suitable format, such as REpresentational State Transfer ("REST"), Simple Object Access Protocol ("SOAP"), and the like. The requests and responses may be encoded, for example, using Base64 encoding, encrypted with a cryptographic key or the like.

In an example implementation, a computing device 102 configured to receive instructions from a user (referred herein sometimes as simply a "user device") initiates a request 104 to obtain a token (e.g., JavaScript Object Notation Web Token (JWT)) for access to one or more computing resources, for instance, using an API as described above. The request 104 may include an identifier of the computing resource, user identification information (e.g., user account identifier), and the like. In some example implementations, multiple requests 104 may be generated and sent to the identity provider 108 for processing. The request 104, once generated, may be sent over a network 106, either via a wired or wireless connection, to an identity provider 108 using an API as described above. In various embodiments, network 106 may include the Internet, a local area network ("LAN"), a wide area network ("WAN"), a cellular data network and/or other data network. The network 106 may be an internal trusted network that the computing device is executing within or, in other implementations, the network 106 may be an external network.

The request 104 may be received by a request interface 110 executing in association or in connection with an identity provider 108. In some implementations, the identity provider 108 may be managed by a third-party entity that is separate or distinct from the entities that manage the computing device 102 and the content. In some implementations, the request interface 110 receives the request 104 and analyzes it in connection with an authentication engine 112. In other implementations, the request interface 110 routes the request to the authentication engine 112 to enable the authentication engine 112 to identify, extract, and analyze the information included with the request 104. In some example implementations, the request 104 includes information such as network location information (e.g., what type of network the request was sent over), computing device 102 capabilities, availability of authentication tokens, access cookies, and the like. The authentication engine 112, in some example implementations, determines which authentication provider of the plurality of authentication providers 114 to redirect the computing device 102 to. The authentication engine 112 uses information from the request 104 to determine and implement one or more discovery strategies such that an authentication provider of the plurality of authentication providers 114 can be selected. The authentication engine 112 does not require additional information from the computing device 102 other than the information that was included in the request 104 to determine which authentication provider of the plurality of authentication providers 114 to select. That is, the authentication engine 112 may determine automatically for the computing device 102, after implementing a discovery strategy, a proper authentication provider solely based on the information provided in the request 104. As such, additional user input, signals and/or information from the computing device 102 may not be necessary. The one or more discovery strategies may be a set of algorithms or instructions that, when implemented, use the information included in the request to determine and select an authentication provider out of the plurality of authentication providers 114.

In some implementations, the discovery strategy that the authentication engine 112 implements are preconfigured or predetermined by a customer/user associated with the computing device 102 and stored separately in a data store (not depicted in FIG. 1). Each customer/user is associated with an account ID or identifier that includes information to one or more discovery strategies stored in the data store. In another example implementation, each of the different strategies is implemented based on the different types of information received. That is, dependent on the type of information that are received in connection with the request for a token generated by the computing device 102, there may be one discovery strategy from a plurality of strategies that is selected and then implemented accordingly. In an example implementation, the identity provider 108 detects that the request 104 is coming from an in-house internal network and the identity provider 108 causes the authentication engine 112 to select a discovery strategy to implement. This results in the computing device 102 being redirected to an authentication provider such as a Kerberos-based authentication provider. A Kerberos-based authentication provider is just one example of an authentication provider as other types of authentication providers may also be used to satisfy the request 104. That is, in some example implementations, a second request from the same computing device may have the same type of information included in the request 104 but a different type of discovery strategy may be implemented where a different type of authentication provider of the plurality of authentication providers 114 is selected.

To put another way, the request 104 may be generated by the computing device 102 where a user who is browsing web applications on the computing device 102 is seeking to access content. The web application may be associated with multiple authentication providers 114 so it may be beneficial to have an authentication engine 112 of the identity provider 108 to handle and determine a suitable authentication provider to redirect the computing device 102 to such that a token can be created to satisfy the request 104. The request 104 is satisfied by the selected authentication provider when a token is generated by the selected authentication provider and provided back to the computing device 102. The computing device 102 may then use the token and present it back to the identity provider 108 such that an identity assertion may be obtained. The identity assertion is provided back to the computing device 102 and the computing device 102 may then present the identity assertion to access computing services, computing resources, and/or content associated with the web application that the user is browsing.

Figure 2:
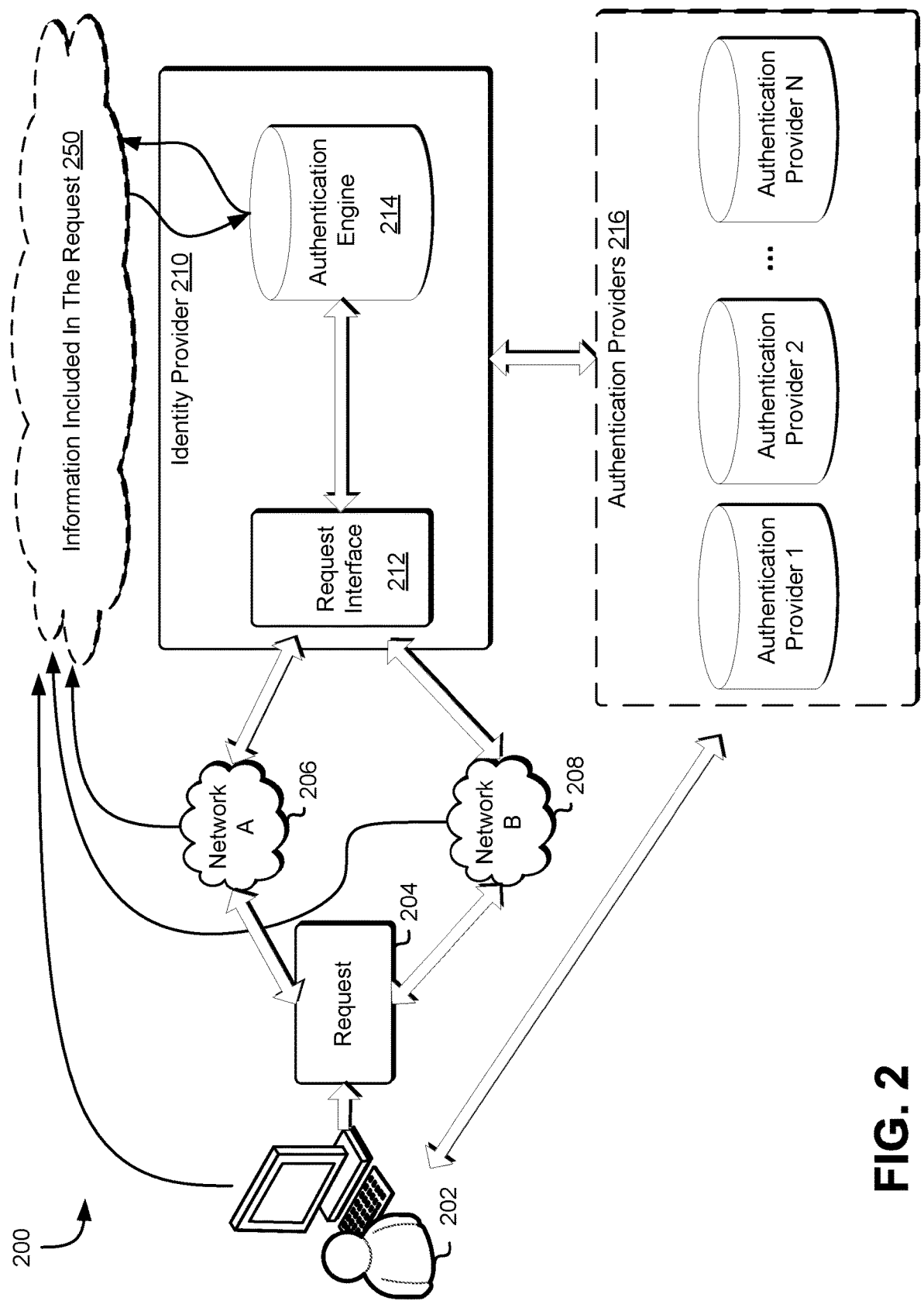
FIG. 2 shows another illustrative example environment between a computing device and an identity provider.

FIG. 2 shows another illustrative example environment 200 between a computing device 202 and an identity provider 210. In an example implementation, a request 204 is received from a computing device 202 via one of a plurality of networks 206, 208 to a request interface 212 of an identity provider 210. In an example implementation, the request 204 is sent over Network A 206. Network A 206 is a trusted network such as a network that is managed by a corporation where the computing device 202 is part of. This information 250, such as the network location, is included in the request 204 when it arrives at the identity provider 210 and the authentication engine 214 may implement a discovery strategy to select an authentication provider from a plurality of authentication providers 216.

As further show in FIG. 2, the discovery strategy is implemented by the authentication engine 214 based on information that the request 204 was sent over Network A 206 (which is a trusted network), preconfigured user/customer preferences, and/or system policies. The discovery strategy is then be implemented by the authentication engine 214 to indicate which authentication provider to select and redirect the computing device 202 to. In this example implementation, the selected authentication provider is a Kerberos-based authentication provider; however, as described above, other types of authentication providers is also be selected in lieu of a Kerberos-based authentication provider. In some example implementations, the authentication engine 214 uses additional information beyond the network location information to determine which authentication provider to select. As noted above, additional information may include the computing device's 202 capabilities, the availability of authentication tokens that can be provided, access cookies associated with the request 204, and the like.

As further shown in FIG. 2, in an alternate example implementation, the request 204 is sent over Network B 208 (which may be an external network that is not trusted) and the authentication engine 214 associated with the identity provider 210 selects a different authentication provider to redirect the computing device 202 to. The computing device 202 may be redirected to a different authentication provider (an authentication provider that is not Kerberos based) than the example implementation provided above with respect to the request 204 being sent over Network A 206. In this example implementation, the authentication engine 214 uses information from the request to implement a discovery strategy that selects a different authentication provider. Again, the discovery strategy is selected from a plurality of discovery strategies that are stored in a data store (not depicted in FIG. 2) separate from the environment 200. The data store may contain different discovery strategies that were preconfigured by customer/user's (e.g., user preferences) and/or system policies. The data store may be queried to select one or more of the discovery strategies in the data store. In some implementations, the discovery strategy is implemented based information included in the request 204. On the proper discovery strategy is implement, the authentication engine uses the information to decipher which authentication provider should the computing device 202 be redirected to in order to obtain a token. The token may then be used by the computing device 202 to cause the identity provider 210 to generate an identity assertion for the computing device 202 to use such that computing services, computing resources, and/or content can be accessed by the computing device 202 accordingly.

Figure 3:
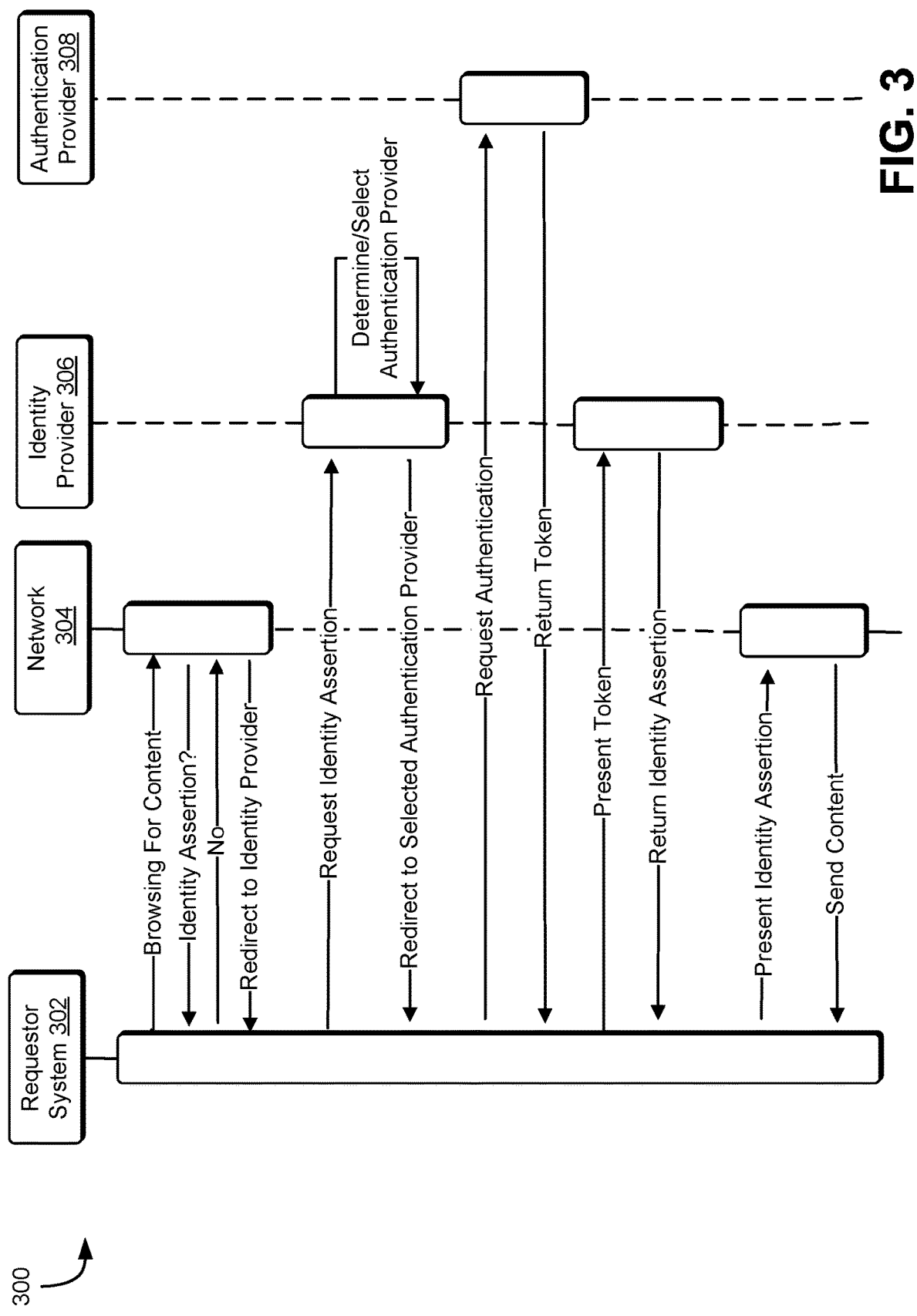
FIG. 3 shows an illustrative example process of generating an authentication response between a requestor system and an identity provider.

FIG. 3 shows an illustrative example process 300 of generating an authentication response between a requestor system 302 and an identity provider 306. The authentication response may be in the form of presenting the requestor system 302 with an identity assertion such that the requestor system 302 can access content. That is, in an example implementation, the requestor system 302 is a computing device that is configured to generate one or more requests for a token (e.g., JWT) which then can be used to obtain an identity assertion (e.g., SAML assertion) to access content. Once the identity provider 306 recognizes that the requestor system 302 has the proper access or authentication to access content, the content is provided.

To implement this, and as shown in FIG. 3, a user/customer interacts with a computing device (e.g., requestor system) by using an interface to navigate a web service or web application on the computing device. The user/customer, while utilizing the requestor system 302, may open a web browser and seek to obtain content from a website; however, the requestor system 302 may not have an identity assertion to be able to access the content for this specific website. Thus, the requestor system 302 sends a request to an identity provider 306 for an identity assertion and based on information that is included in the request, the request is redirected to an authentication provider 308 out of a plurality of authentication providers. The request may be an authentication request where it may be satisfied when an authentication token (e.g., VPN tokens, Yubikey) is provided back to the requestor system 302.

In this example implementation, as shown in FIG. 3, an identity assertion has not been provided by the requestor system 302 while seeking content using a web application on a network 304 so the content cannot be provided back to the requestor yet. Instead, the requestor system 302 is redirected to an identity provider 306 that has an authentication engine to determine and select an authentication provider to satisfy the identity assertion request. The identity provider 306 may also be configured with a request interface that is configured to receive requests from requestor systems. Once the request is received, the request is analyzed to determine what kind of information is included in the request. The request includes information such as network location information, the requestor system's capabilities, the availability of authentication tokens that can be provided by certain authentication providers, access cookies accompanying the request, and the like.

Specifically, the identity provider 306 in connection with an authentication engine may select a preconfigured or predetermined discovery strategy to implement. In some implementations, the information included in the request determines a specific discovery strategy to be implemented. The information is provided as run-time signals or near real-time signals. In some example implementations, the run-time signals are not provided or included in the request and the identity provider 306 pulls the signals from elsewhere. That is, the request includes metadata or an identifier that indicates a specific location where the identity provider 306 can pull or obtain information about the request from. This location may be a data store associated with the requestor system. In some example implementations, the discovery strategy is not implemented until at least one signal has been received at the authentication engine. In other example implementations, if signals are not received with the request, the authentication engine still implements a discovery strategy to select an authentication provider. The discovery strategy may be a default discovery strategy that simply redirects the requestor system 302 to a default authentication provider.

After run-time signals are received and a discovery strategy is implemented, the authentication engine uses the information from these signals as input and generates an output indicating an authentication provider 308 that can be used to provide a token to satisfy the request. That is, the authentication engine uses information from the signals without analyzing or receiving additional input or signals from the requestor system 302 to automatically select an authentication provider 308. In some example implementations, the discovery strategy outputs a list of authentication providers and ranks each individual provider, where the list allows the authentication engine to select the most appropriate authentication provider to use based on the highest ranked provider on the list. Or in some other example implementations, an authentication provider is selected by the authentication engine when it meets a certain threshold value where information from the request is matched with other information associated with each authentication provider to determine the best match. Once the authentication provider is identified and selected, the identity provider redirects the requestor system to the selected authentication provider. A plurality of authentication providers may be associated with certain web services or applications so a dynamic decision by the authentication engine using the discovery strategy may be made to select one of the authentication providers to satisfy the request by the requestor system 302.

The requestor system 302 then sends a request to the selected authentication provider for a token so that the requestor system 302 may then submit the token to the identity provider 306 for access to content. That is, once the token is presented by the requestor system 302 to the identity provider 306, an identity assertion such as a SAML assertion is sent back to the requestor system 302. The identity assertion is then used or presented by the requestor system 302 to obtain content or resources on network 304.

Figure 4:
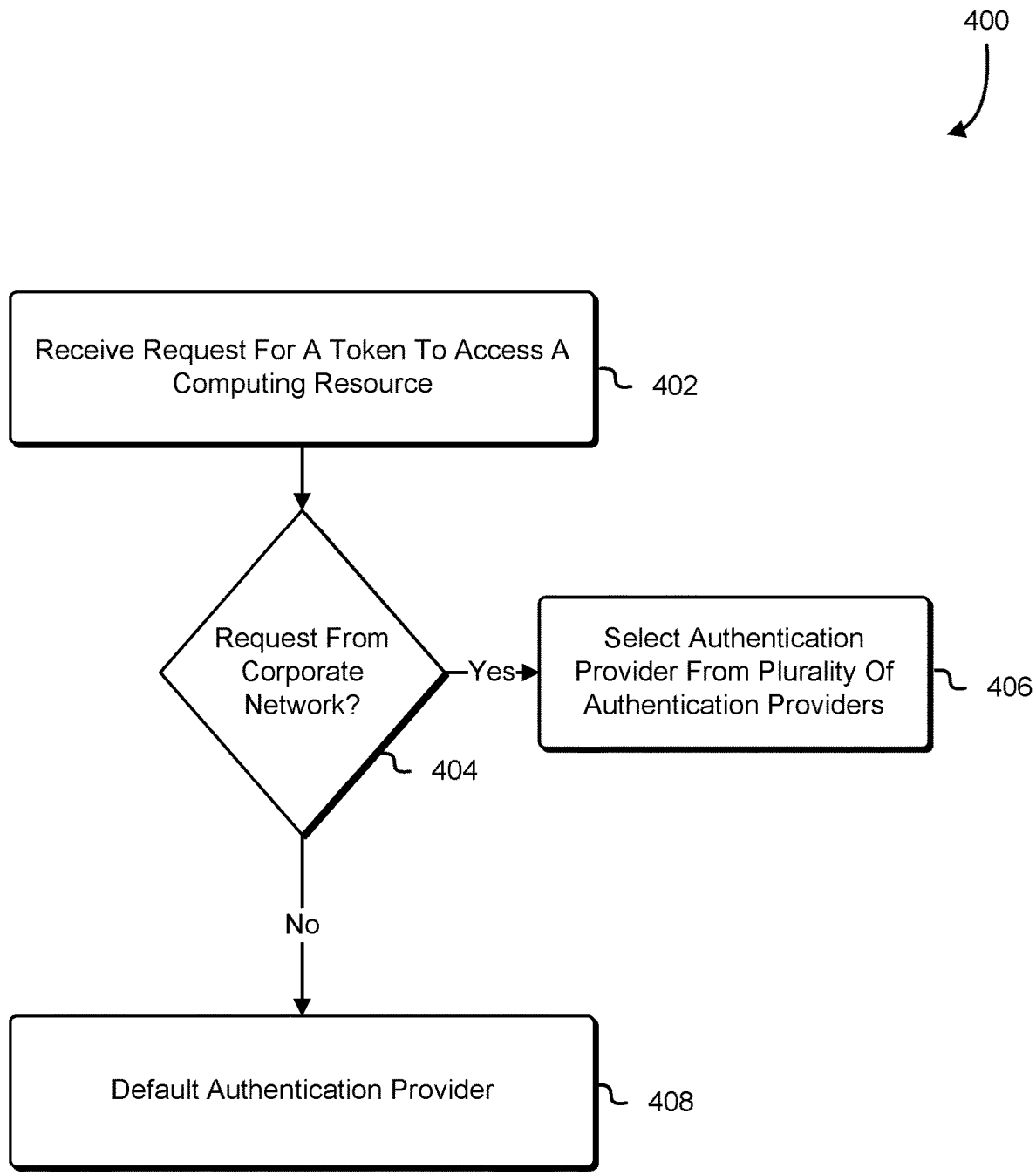
FIG. 4 shows an illustrative example of a process to determine and select an authentication provider.

FIG. 4 shows an illustrative example of a process 400 to select an authentication provider. That is, FIG. 4 illustrates an example of implementing a discovery strategy such that an authentication provider out of a plurality of authentication providers is selected. Once a request for a token to access a computing resource is received 402 at the identity provider, the authentication engine associated with the identity provider may determine a discovery strategy to implement. The determination of the discovery strategy may be based on the information included in the request or it may be based on preconfigured user/customer preferences. As described above with respect to FIGS. 1-3, the information included in the request may include information such as network location information, device capabilities, availability of authentication tokens, access cookies, and the like.

In 404, the discovery strategy, when implemented, may determine whether the request received indicates network location information that the request was sent over a corporate network (e.g., "In-Corp network") or a trusted network. This may be performed by comparing the prefix of Internet Protocol (IP) network address of the request with prefixes from an approved list of IP network address in the corporate network. If the request was sent over the corporate network, in 406, the authentication engine may select one authentication provider out of a plurality of authentication providers to satisfy the request. In some example implementations, the selected authentication provider may be a Kerberos authentication provider. In some example implementations, as shown in 408, the discovery strategy implemented may determine that the request did not come from the corporate network. Once that has been identified, the authentication engine may indicate that another authentication provider be selected. The other authentication provider may be a default authentication provider. The default authentication provider may be an authentication provider that was previously defined for the user associated with the request.

Figure 5:
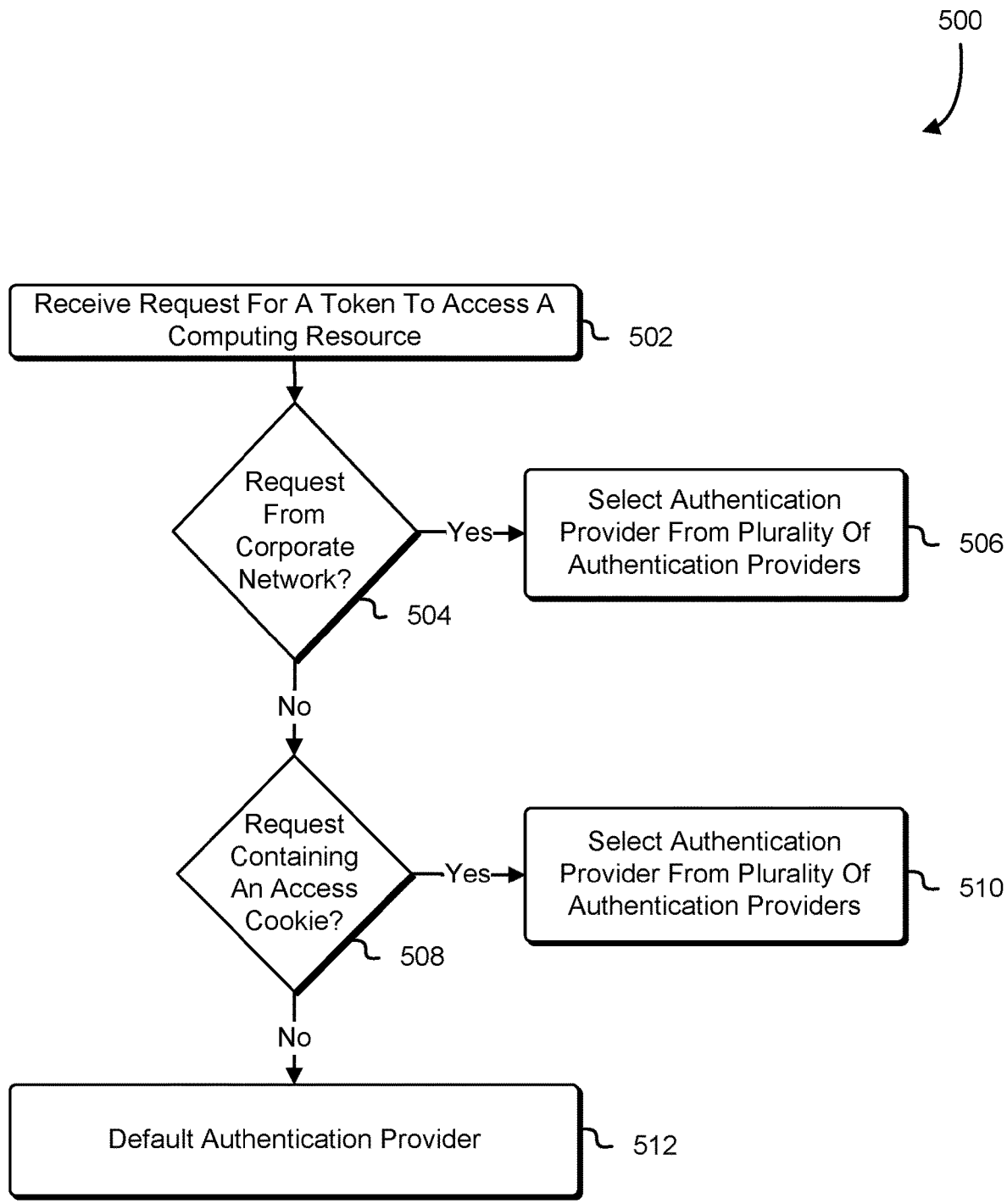
FIG. 5 shows another illustrative example of a process to determine and select an authentication provider.

FIG. 5 shows another illustrative example of a process 500 to select an authentication provider. As described with respect to FIG. 4, FIG. 5 is also an illustration of an example of implementing a discovery strategy to select an authentication provider out of a plurality of authentication providers. Once a request for a token to access a computing resource is received 502 at the identity provider, the authentication engine associated with the identity provider may implement a discovery strategy. The implementation of the discovery strategy may be based on the information included in the request or preconfigured user/customer preferences. In 504, a determination is made whether the request received indicates network location information that the request was sent over a corporate network by comparing the prefix of Internet Protocol (IP) network address of the request with prefixes from an approved list of IP network address in the corporate network. If the request was sent over the corporate network, in 506, the authentication engine may select one authentication provider out of a plurality of authentication providers. The one authentication provider may be a Kerberos-based authentication provider to satisfy the request.

In some example implementations, as shown in 508, the discovery strategy implemented determines that the request did not come from the corporate network or a trusted network and a second determination is made as to whether the request included a cookie. That is, the discovery strategy is determined whether the request has a specific type of access cookie that is embedded therein. Once the cookie has been identified, in 508, the authentication engine may select 510 another type of authentication provider to satisfy the request. In some example implementations, the authentication provider selected is a Midway authentication provider. In some example implementations, as shown in 512, the discovery strategy implemented determines that the request did not come from the corporate network or contain an access cookie. Once that has been identified, the authentication engine may indicate that a default authentication provider be used to satisfy the request. Again, the default authentication provider may be an authentication provider that was previously defined for the user associated with the request.

Figure 6:
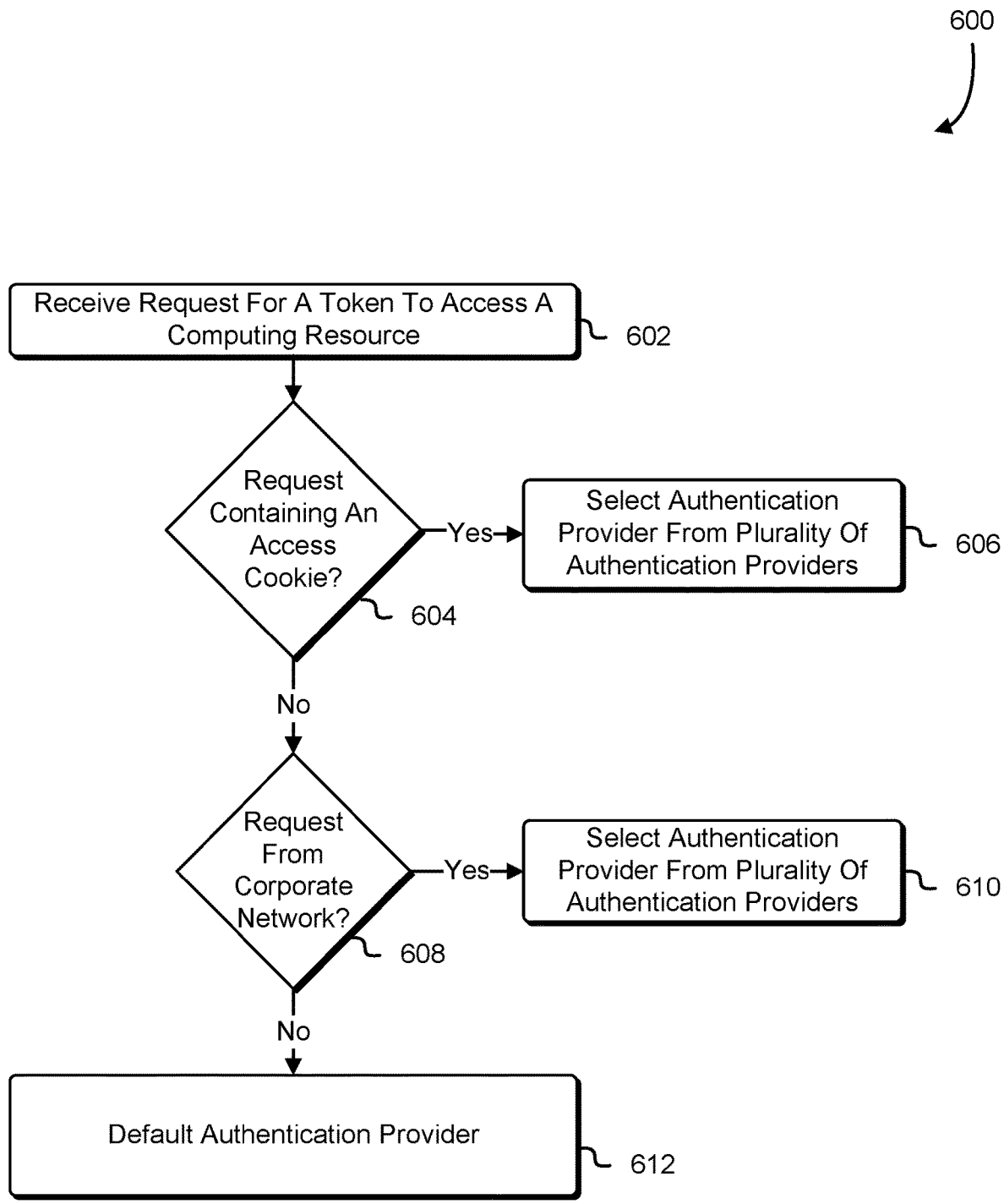
FIG. 6 shows yet another illustrative example of a process to determine and select an authentication provider.

FIG. 6 shows yet another illustrative example of a process 600 to select an authentication provider. As described with respect to FIGS. 4 and 5, FIG. 6 is also an illustration of implementing a discovery strategy to select an authentication provider out of a plurality of authentication providers. Once a request for a token to access a computing resource is received 602 at the identity provider, the authentication engine associated with the identity provider may implement a discovery strategy. The determination of the discovery strategy may be based on the information included in the request or based on preconfigured user preferences and/or system policies. In 604, a determination is made whether the request received has a specific type of access cookie that is embedded therein. Once the cookie has been identified, in 604, the authentication engine may select 606 another type of authentication provider to satisfy the request. In some example implementations the authentication provider selected may be a Midway authentication provider.

In some example implementations, as shown in 608, the discovery strategy implemented determines that the request did not have an access cookie and make a second determination as to whether the request came from the corporate network. If the request indicates network location information that the request was sent over a corporate network by comparing the prefix of Internet Protocol (IP) network address of the request with prefixes from an approved list of IP network address in the corporate network. If the request was sent over the corporate network, in 610, the authentication engine may select the correct or ideal authentication provider such as a Kerberos-based authentication provider to satisfy the request. As indicated above, the Kerberos-based authentication provider is just one example of a type of authentication provider and other types of authentication providers may be used in place of the Kerberos-based authentication provider.

In some example implementations, as shown in 612, the discovery strategy implemented determines that the request did not come from the corporate network or contain an access cookie. Once that has been identified, the authentication engine indicates that the default authentication provider be used to satisfy the request. The default authentication provider may be an authentication provider that was previously defined for the user associated with the request.

Figure 7:
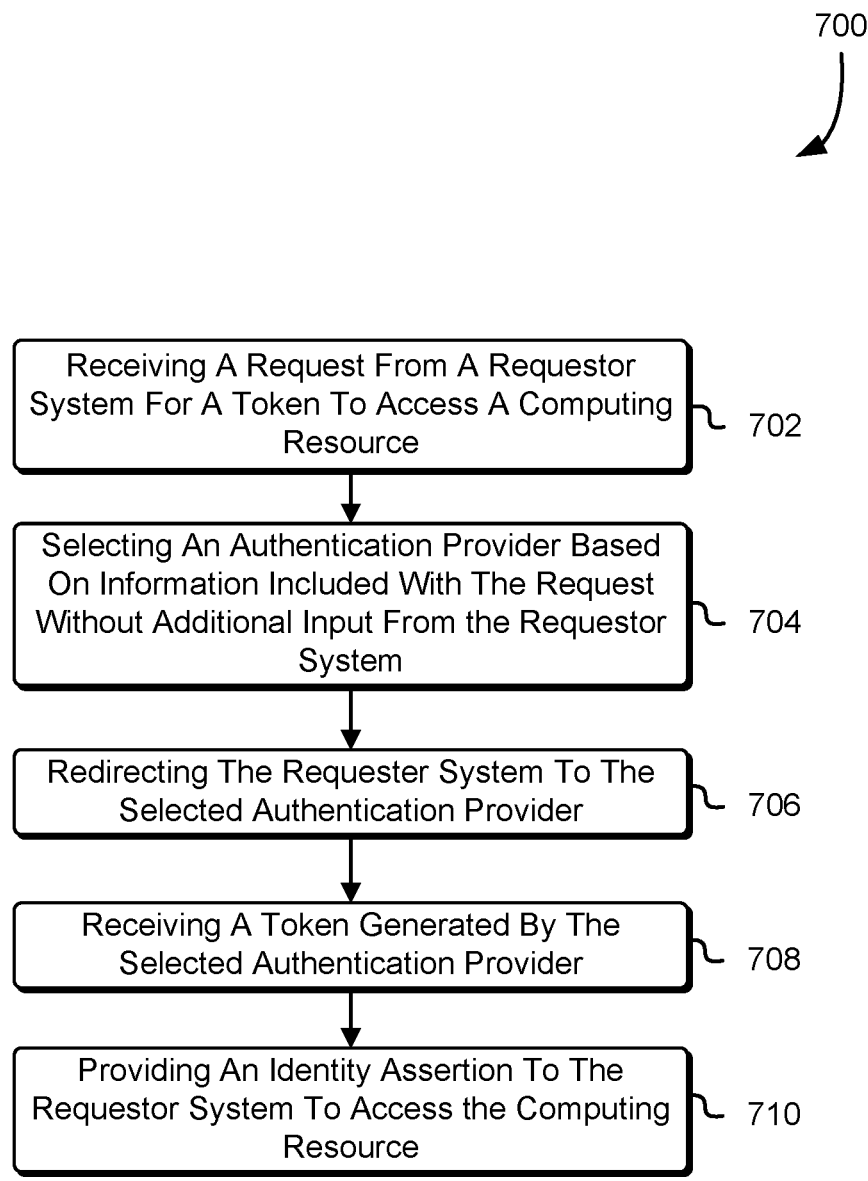
FIG. 7 shows an illustrative example of a process to select an authentication provider.

FIG. 7 shows an illustrative example of a process 700 to select an authentication provider. The process may be performed by an authentication engine or authentication service in connection with an identity provider. In 702, a request for a token to access one or more computing resources is received. The request may be an authentication request that is generated by a computing device (e.g., requestor system) seeking to access computing services, computing resources, and/or content. The request may include information such as network location information, the capabilities of the computing device that generated the request, the availability of authentication tokens, access cookies and the like. The request may be sent from the computing device to a request interface configured to receive requests at the identity provider over a network.

In 704, once the request is received, the identity provider may analyze the information included with the request to determine, identify, and/or select an authentication provider to generate a token. In an example implementation, the selection of the authentication provider does not require additional input or information from the requestor system. That is, once a request from the requestor system is sent, the identity provider automatically selects the authentication provider to generate the token for the requestor system without the need for additional input (e.g., causing the requestor system to have to select an authentication provider). The identity provider may utilize an authentication engine that is configured to identify a list of authentication providers associated with the requestor system and further analyze the information included with the request to select an authentication provider to respond to the request. In other words, the user, while executing web services and/or applications on the requestor system, may be associated with a user account that has multiple different authentication providers. As such, the authentication engine is configured to track and manage the mappings between each of these user accounts and the multiple authentication providers associated with all the user accounts.

The information included with the request may be extracted from the header and/or metadata associated with the request. In another example implementation, the information is not included in the request but is an identifier that identifies the location to obtain information about the request. The identifier indicates a data store or data storage device that has data indicating information about the request. The data store or data storage device may be associated with the identity provider or it may separate from the identity provider.

In 706, once the information included in the request is determined, the information is analyzed by the authentication engine using a discovery strategy to select a proper authentication provider that satisfies the request. The discovery strategy may be a set of instructions and/or algorithms that takes the information from the request as input and determines an authentication provider for the requestor system such that the request can be satisfied. In another example implementation, the discovery stagey analyzes the information from the requests and provides a list of authentication providers using a ranking system. That is, the list may indicate that one authentication provider is better suited to satisfy and generate a token in response to the request over another authentication provider. Based on the ranking system, the highest ranked authentication provider is selected and the requestor system is redirected to selected authentication provider for the token. In another example implementation, the discovery strategy matches information from the request to information associated with each of the authentication providers to determine a best match and the best matched authentication provider is automatically selected.

The discovery strategy is preconfigured by a user or customer and/or it is based on system configuration policies and the like. In some example implementations, the discovery strategy is stored in a data store or data storage device in connection with the identity provider or it may be separate from the identity provider. Accordingly, when a user or customer who is executing a web application on a requestor system, the requestor system submits a request for a token to access one or more computing resources. Subsequently, once the request is received, the identity provider can retrieve a preconfigured discovery stagey, based on information from the request, from the data store that is associated with the user or customer. The identity provider may then implement the preconfigured discovery strategy to determine and select an authentication provider. In some example implementations, a different request from the requestor system may have the same information (e.g., signals) included in the request and a different strategy can be implemented such that a different type of authentication provider is selected. The identity provider may then cause the requestor system to be redirected to the selected authentication provider. The authentication provider may then authenticate the requestor system and provide a respective token in response to the request.

In other words, the identity provider, using an authentication engine and based on the discovery strategy associated with the user account or requestor system of the request informs and redirects the requestor system of the selected authentication provider. That is, requestor system is now directed to an authentication provider that is capable of satisfying the request and a token can be provided back to the requestor system.

In 708, the requestor system may then submit the token generated by the selected authentication provider and, in 710, an identity assertion (e.g., SAML assertion) may be provided back to the requestor system such that it enables or allows the requestor system to access computing resources.

Figure 8:
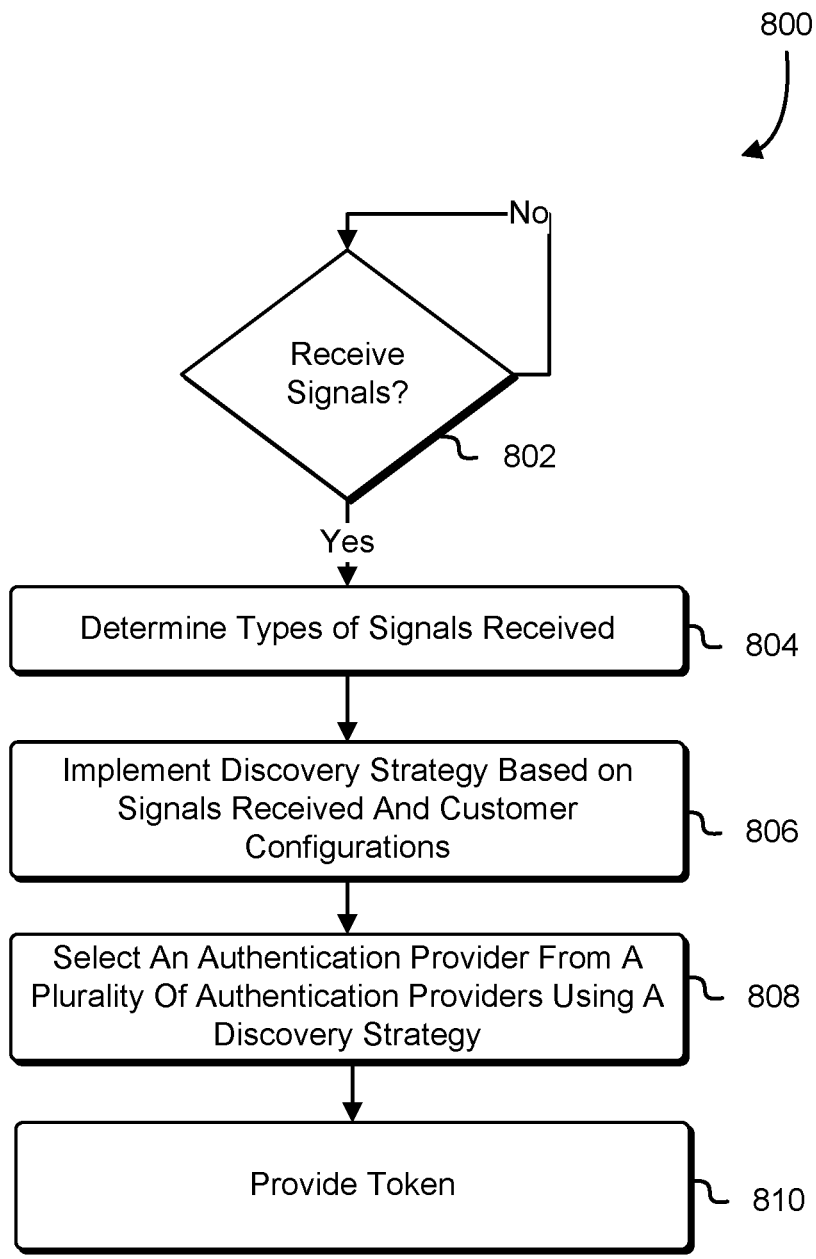
FIG. 8 shows an illustrative example of a process to use information included in an authentication request to select an authentication provider.

FIG. 8 shows an illustrative example of a process 800 to use information included in an authentication request to determine a discovery strategy to implement such that an authentication provider is selected. In 802, an identity provider may receive, obtain, or extract information included in the request for a token to access a computing resource as run-time signals. As described above with respect to FIG. 3, run-time signals may indicate network location information, computing device (e.g., requestor system) capabilities, availability of authentication tokens, access cookies, web browser cookies, and the like. These run-time signals may be provided and included in the request when the identity provider receives the request. However, in some example implementations the run-time signals may not be included and the identity provider may need to send a separate request to a data store, for instance, to obtain information associated with the request. That is, a data store may have a repository that includes information about requests that are sent from a specific user account executing applications on a requestor system. In some other example implementations, the run-time signals may not be included in the requests but rather the identity provider may need to pull the signals. That is, instead of the signals being pushed to the identity provider, the identity provider may need to send an additional request or instructions to the requestor system to obtain information about the request system itself and information associated with the request.

In 804, once the signals are received at the identity provider, the identity provider may determine the different types of signals received. That is, the types of signals may include information about which network the requests originated from and the cookies associated with the web application that the user is executing on the requestor system. These types of signals may be organized as groups based on its type. In an example implementation, types of signals that are directed to the network or network location information are grouped together. In another example implementation, signals that are directed to the requestor system capabilities are grouped together.

In 806, the identity provider associated with the authentication engine may determine what kind of signals has been received in order to determine a discovery strategy to implement. Based on the amount and/or types of signals that are received, the authentication engine may determine a specific discovery strategy to implement. As described above with respect to FIG. 1, a user may have multiple discovery strategies that were preconfigured and stored in a data store. The preconfigured discovery strategies may be implemented based on factors stemming from the information included in the requests or it may be implemented simply based on user's preference or system policies.

In 808, once the discovery strategy is determined and implemented, the authentication engine selects an authentication provider from a plurality of authentication providers. The discovery strategy may receive the information from the request as input, and based on a set of algorithms or instructions, generate an output that indicates which authentication provider associated with the user that generated the requests is the most ideal to satisfy the requests. In some example implementations, the discovery strategy outputs a list of authentication providers and ranks them according to the highest likelihood of successfully providing the token in response to the request to the least likely of successfully providing the token. In another example implementation, the discovery strategy outputs authentication providers that have met a certain threshold. In other words, the discovery strategy selects an authentication provider if the authentication provider is 80% (or whichever predetermined percentage) likely to successfully provide the token in response to the request. That is, information regarding what types of signals are included in the request drives the output of the discovery strategy, when implemented, by the authentication engine. In other words, the signals are factors that, when considered collectively, determine which or what kind of authentication provider should be used.

In an example implementation, and as described with respect to FIG. 4, a discovery strategy is implemented when the request is originated from a trusted, in-house network, or "In-Corp" network. An "In-Corp" network is a network that is inside an organization where the requestor system is already authenticated to access resources. Based on this, the request includes information that the request was generated inside the network where the discovery strategy determinist that the requestor system be redirected to a Kerberos-based authentication provider because the network location information indicates that the request originated from an 'In-Corp" network.

In 810, a token is provided to the requestor system in response to the request. That is, once the authentication provider is selected, the requestor system is redirected to the selected authentication provider such that the selected authentication provider generates a token for the requestor system to satisfy the requests. The token is provided from the identity provider to the requestor system; however, in some example implementations, the token is previously generated from the authentication provider and stored in a data store until the requestor system attempts to retrieve it.

Figure 9:
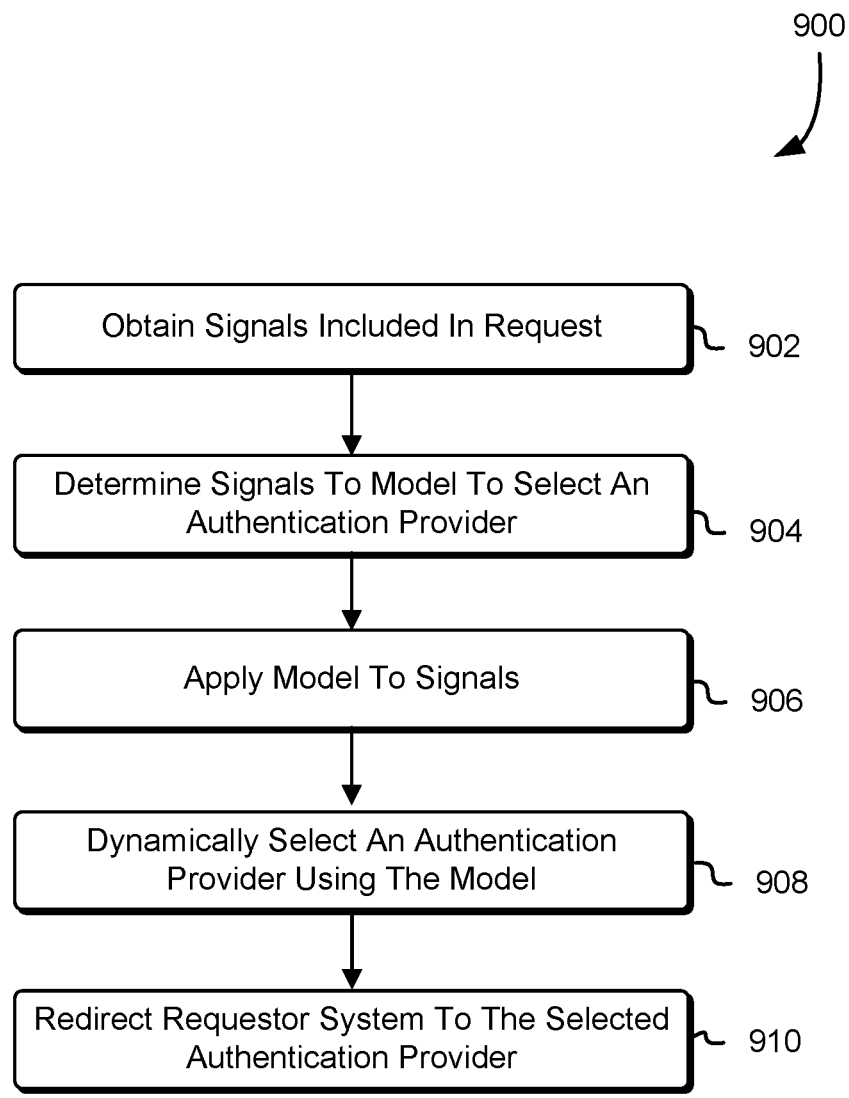
FIG. 9 shows an illustrative example of a process for using a model to determine an authentication provider from a plurality of authentication providers.

FIG. 9 shows an illustrative example of a process 900 for using a model to determine an authentication provider from a plurality of authentication providers. In other words, FIG. 9 illustrates a process where selecting an authentication provider is performed using a model, a probabilistic model, and/or a machine learning technique. In 902, the information included in the request (e.g., run-time signals) from a requestor system is obtained or received. The run-time signals may be provided in real-time such that it contains the most up to date information about the network or devices associated with the request.

In 904, the run-time signals that are used as the inputs to a model can be determined based on user-defined instructions and/or system policies. In some embodiments, the model is a probabilistic model, a supervised model, a neural network, random forest, decision tree, and the like. In an example implementation, the model is trained using machine-learning techniques based on data that indicates whether previous requests were directed to the same computing resources twice in a specified timespan or, in some implementations, based on the amount of time between requests for the same computing resource. In some implementations, the inputs include a customer ID, a user ID, user-specified tags associated with the request, network location information, device capabilities, access cookies, and/or other data.

Once the inputs to the model have been determined, the model may then be applied to the inputs 906 and a decision to implement a discovery strategy to select an authentication provider 908 can be made. The model may be trained such that an indication that a subsequent request for the same computing resources using the same network would be generated by the same computing device soon or within a certain timeframe (e.g., within three days), the authentication engine may determine a discovery strategy and utilize the discovery strategy to select an authentication provider faster and more efficiently. That is, if the model results in an indication that subsequent requests for this same resource or content would most likely be similar to previous requests coming from the same requestor system using the same network then an authentication provider may be quickly identified and selected. Moreover, the model is trained to be updated based on previous selections of authentication providers associated with each requestor system. As such, any subsequent requests are quickly redirected 910 from the requestor system to the selected authentication provider to generate a token may be processed more efficiently and faster using the model.

Figure 10:
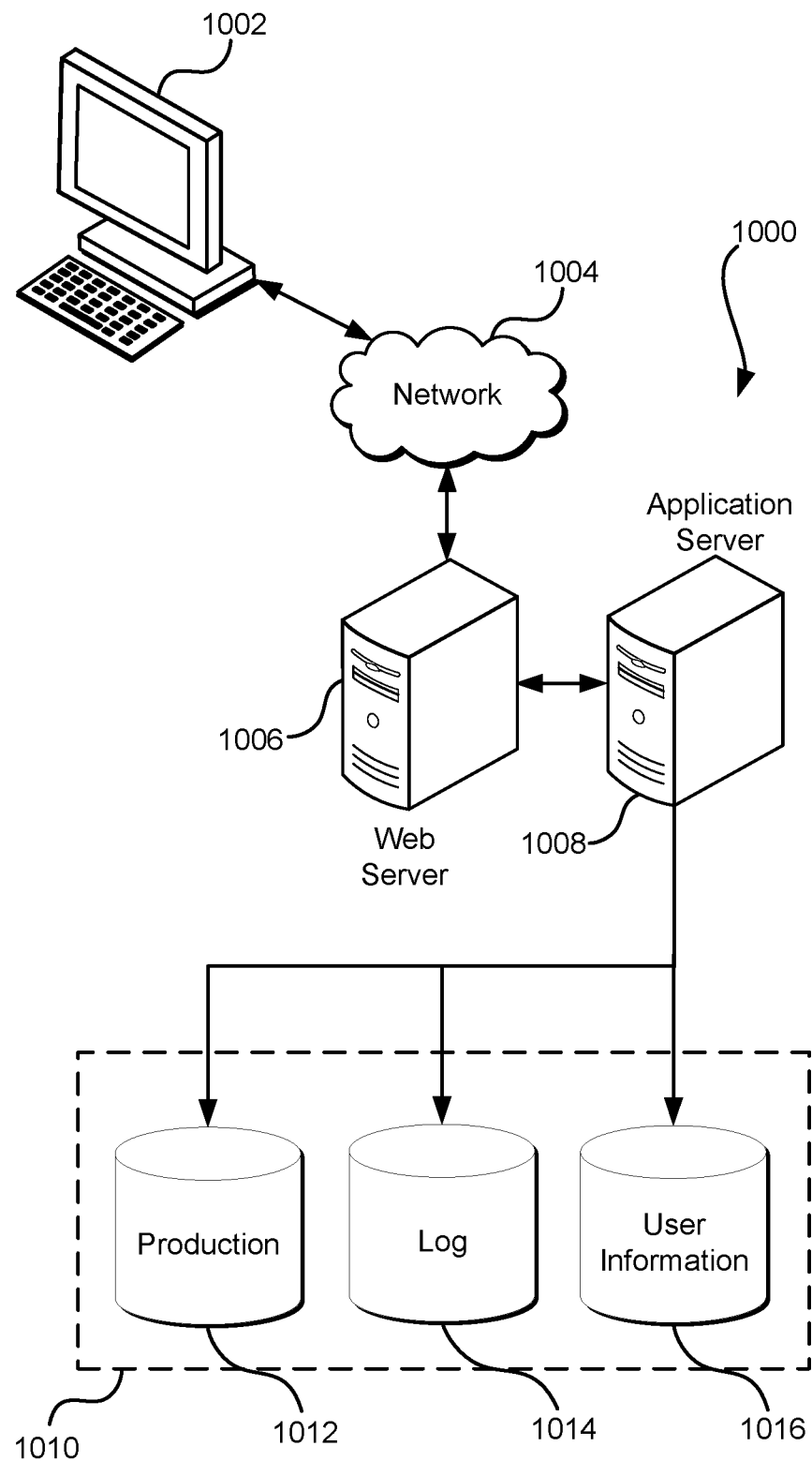
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular, or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually, and/or through other senses. The handling of all requests and responses, as well as the delivery of content between the client device 1002 and the application server 1008, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update, or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers, or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing," are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method, comprising:
   obtaining, from a requestor system, a request for a token to access a computing resource;
   performing a selection, based on information indicating a trusted location from which the request was made and an availability of tokens corresponding to each authentication provider from a plurality of authentication providers, for an authentication provider from the plurality of authentication providers without additional input from the requestor system to which the requestor system is able to authenticate, wherein the information comprises a prefix of an Internet Protocol (IP) address of the request that matches the trusted location;
   redirecting the requestor system to the selected authentication provider;
   obtaining, from the requestor system, a token generated by the selected authentication provider; and
   providing, to the requestor system, an identity assertion that enables the requestor system to access the computing resource.

2. The computer-implemented method of claim 1, wherein information included with the request, includes signals associated with at least one of:
   network location information,
   requestor system capabilities, or
   access cookies.

3. The computer-implemented method of claim 1, further comprising selecting, based on information included with the request, a default authentication provider from a plurality of authentication providers when information from the request does not match information from any of the plurality of authentication providers.

4. The computer-implemented method of claim 1, wherein identity assertion is an OAuth token or Security Assertion Markup Language (SAML) assertion.

5. A system, comprising:
   memory to store instructions which, as a result of being executed by one or more processors of the system, cause the system to at least:
      in response to a request from a requestor system, select, based at least in part on information indicating a network from which the request was made, whether the network is trusted, an availability of tokens from each of a plurality of authentication systems, and without additional input from the requestor system, an authentication system from the plurality of authentication systems among different alternative authentication systems capable of authenticating to obtain access to a computing resource, wherein the determination of whether the network is trusted is based, at least in part, on a prefix of an Internet Protocol (IP) address of the requestor system; and
      route the requestor system to the selected authentication system to enable the requestor system to obtain information usable to obtain access to the computing resource.

6. The system of claim 5, wherein the instructions further cause the system to:
   generate, via an application executing on the requestor system, a request for a token to access to the computing resource; and
   send the request for the token, from the requestor system to an identity provider to access the computing resource.

7. The system of claim 6, wherein the identity provider is managed by a third-party entity to select the authentication system using information associated with the requestor system.

8. The system of claim 5, wherein information associated with the requestor system includes at least one of: network location information, requestor system capabilities, or access cookies.

9. The system of claim 5, wherein authentication tokens include at least one of:
   Virtual Private Network (VPN) tokens,
   Yubikey,
   OAuth tokens,
   Security Assertion Markup Language (SAML), or
   Single Sign-On (SSO) tokens.

10. The system of claim 5, wherein the instructions further cause the system to:
    query a data store to select, based on the information associated with the requestor system, a discovery strategy from a plurality of discovery strategies; and
    implement the selected discovery strategy to determine which one of the plurality of authentication systems to select, wherein the implemented discovery strategy uses the information to output a list of ranked authentication providers.

11. The system of claim 10, wherein the plurality of discovery strategies are preconfigured based on user preferences to determine which one of the plurality of authentication systems to select.

12. The system of claim 5, wherein the instructions further cause the system to select a default authentication system when information associated with the requestor system does not match information from any of the plurality of authentication systems.

13. A non-transitory computer-readable storage medium comprising executable instructions that, as a result of being executed by one or more processors of a computer system, cause the computer system to at least:
   in response to a request for access to a computing resource from a requestor system, direct the requestor system to an authentication provider selected, the authentication provider being selected from a plurality of authentication providers as a result of an indication of a prefix of an Internet Protocol (IP) address associated with the requestor system to further indicate a source of the request being trusted, determining availability of tokens for each of the plurality of authentication providers, and without additional input associated with the requestor system, wherein each of the plurality of authentication providers indicate alternate ways of authenticating to obtain access to the computing resource; and
   allow the requestor system to, as a result of successfully authenticating with the selected authentication provider, access the computing resource.

14. The non-transitory computer-readable storage medium of claim 13, wherein the source of the request is determined to be trusted by performing instructions that further cause the computer system to:
   compare the IP prefix with a list of approved IP address prefixes; and
   select the authentication provider based at least in part on the IP address prefix being on the list of approved IP address prefixes.

15. The non-transitory computer-readable storage medium of claim 13, wherein the instructions further cause the computer system to:
   identify that the request includes an access cookie; and
   select the authentication provider based at least in part on information from the access cookie.

16. The non-transitory computer-readable storage medium of claim 13, wherein information associated with the requestor system includes signals indicating at least one of: network location information, requestor system capabilities, or access cookies.

17. The non-transitory computer-readable storage medium of claim 13, wherein the instructions further cause the computer system to:
   select a predetermined discovery strategy from a plurality of discovery strategies stored in a data store; and
   implement the selected discovery strategy, by executing a set of instructions indicated by the selected predetermined discovery strategy to use the-information from the request so as to select the authentication provider from the plurality of authentication providers.

18. The non-transitory computer-readable storage medium of claim 17, wherein each of the plurality of discovery strategies are predetermined based on user preferences.

19. The non-transitory computer-readable storage medium of claim 13, wherein the instructions further cause the computer system to:
   determine inputs associated with information about the requestor system; and
   apply a model to the inputs to generate a selection of an authentication provider from a plurality of authentication providers.

20. The non-transitory computer-readable storage medium of claim 19, wherein the instructions further cause the computer system to update the model based on previous selections associated with the requestor system.

* * * * *